United States Patent
Oyama et al.

(10) Patent No.: US 7,959,888 B2
(45) Date of Patent: *Jun. 14, 2011

(54) RAW COKE FOR ELECTRICITY STORAGE CARBON MATERIAL AND NEEDLE COKE

(75) Inventors: Takashi Oyama, Yamaguchi (JP); Kazuhisa Nakanishi, Yamaguchi (JP); Tamotsu Tano, Yamaguchi (JP); Keiji Higashi, Yamaguchi (JP); Ippei Fujinaga, Yamaguchi (JP); Hiromitsu Hashisaka, Yamaguchi (JP); Toshitaka Fujii, Yamaguchi (JP); Takashi Noro, Yamaguchi (JP); Akio Sakamoto, Tokyo (JP); Kiwamu Takeshita, Tokyo (JP); Keizou Ikai, Kawasaki (JP); Masaki Fujii, Kawasaki (JP); Hideki Ono, Kawasaki (JP)

(73) Assignees: Nippon Oil Corporation, Tokyo (JP); Nippon Petroleum Refining Company, Limited, Tokyo (JP)

( * ) Notice: Subject to any disclaimer, the term of this patent is extended or adjusted under 35 U.S.C. 154(b) by 371 days.

This patent is subject to a terminal disclaimer.

(21) Appl. No.: 12/158,165

(22) PCT Filed: Dec. 27, 2006

(86) PCT No.: PCT/JP2006/326373
§ 371 (c)(1),
(2), (4) Date: Jun. 19, 2008

(87) PCT Pub. No.: WO2007/074939
PCT Pub. Date: May 7, 2007

(65) Prior Publication Data
US 2009/0268375 A1    Oct. 29, 2009

(30) Foreign Application Priority Data

Dec. 27, 2005  (JP) ................................ 2005-375934
Oct. 30, 2006  (JP) ................................ 2006-293962
Dec. 4, 2006   (JP) ................................ 2006-327156

(51) Int. Cl.
| | |
|---|---|
| C01B 31/00 | (2006.01) |
| C01B 31/04 | (2006.01) |
| C01B 31/02 | (2006.01) |
| C01D 3/00  | (2006.01) |
| C09C 1/56  | (2006.01) |
| H01G 9/00  | (2006.01) |
| C10L 1/00  | (2006.01) |
| C10C 3/00  | (2006.01) |
| C10G 11/00 | (2006.01) |
| C10G 9/14  | (2006.01) |
| H01B 1/04  | (2006.01) |
| H01B 1/24  | (2006.01) |

(52) U.S. Cl. .................... 423/445 R; 423/448; 423/460; 423/461; 361/502; 208/14; 208/23; 208/113; 208/131; 252/502; 252/510; 201/6; 201/25

(58) Field of Classification Search ........................ None
See application file for complete search history.

(56) References Cited

U.S. PATENT DOCUMENTS

| | | | | |
|---|---|---|---|---|
| 5,900,189 | A * | 5/1999 | Kawano et al. | ............... 252/502 |
| 2004/0131860 | A1 | 7/2004 | Tano et al. | |
| 2005/0266990 | A1 | 12/2005 | Iwasaki et al. | |
| 2008/0304206 | A1 * | 12/2008 | Tano et al. | .................... 361/502 |

FOREIGN PATENT DOCUMENTS

| | | | |
|---|---|---|---|
| EP | 1 675 141 A1 | | 6/2006 |
| JP | 05-105881 A  | | 4/1993 |
| JP | 05-163491 A  | | 6/1993 |
| JP | 05-202362 A  | | 8/1993 |
| JP | 07-003267 A  | | 1/1995 |
| JP | 2002-110157 A | | 4/2002 |
| JP | 2003-51430 A | | 2/2003 |
| JP | 2003051430 A | * | 2/2003 |
| JP | 2003-272622 A | | 9/2003 |
| JP | 2004-185975 A | | 7/2004 |
| JP | 2004-247433 A | | 9/2004 |
| JP | 2005-123462 A | | 5/2005 |
| SU | 1456447 A | * | 2/1989 |
| WO | 2004/011371 A1 | | 2/2004 |

OTHER PUBLICATIONS

"Prodecure for the measurements of lattice parameters and crystallite sizes of carbon materials by X-ray diffraction", The 117 Committee of the Japan Society for the Promotion of Sciences, No. 221, pp. 52, (2006).

"Basic Carbonization Engineering" by Yuzo Sanada and Sugiro Otani published by Ohmsha Ltd., pp. 147.

* cited by examiner

Primary Examiner — Melvin C Mayes
Assistant Examiner — Guinever S Gregorio
(74) Attorney, Agent, or Firm — Panitch Schwarze Belisario & Nadel LLP

(57) ABSTRACT

The present invention provides a raw coke having such a structure that the graphitized product resulting from graphitization of the raw coke at a temperature of 2800° C. under an inactive gas atmosphere will have ratios of the crystallite size to the lattice constant of 360 or less in the (002) plane and 1500 or less in the (110) plane, as a raw coke providing active carbon produced by alkali-activating the raw coke, which is reduced in remaining alkali content and can simplify washing operation because washing liquid can easily pass through the activated carbon, or as a raw coke for the production of needle coke.

9 Claims, No Drawings

RAW COKE FOR ELECTRICITY STORAGE CARBON MATERIAL AND NEEDLE COKE

CROSS-REFERENCE TO RELATED APPLICATION

This application is a Section 371 of International Application No. PCT/JP2006/326373, filed Dec. 27, 2006, which was published in the Japanese language on Jul. 5, 2007 under International Publication No. WO 2007/074939 A1, and the disclosure of which is incorporated herein by reference.

FIELD OF THE INVENTION

The present invention relates to raw coke for use of the production of electricity storage carbon materials and needle coke. In particular, the present invention relates to raw coke that provides activated carbon from which alkali metals remaining therein are readily removed, suitable for the production of electrodes of double layer capacitors. The present invention also relates to raw coke suitable for the production of needle coke.

BACKGROUND OF THE INVENTION

In recent years, carbon materials have been widely used in the electricity storage field. Among such electricity storage carbon materials, activated carbons, which have a relatively large surface area are used as electrodes of electrical double layer capacitors while coke, which has a relatively small surface area is used as negative electrodes of lithium ion secondary batteries. In particular, electric double layer capacitors have drawn attention because they can be used as backup power supplies, auxiliary power supplies or the like, and in this connection, various development focusing on the properties of activated carbon as electrodes of electric double layer capacitors have been widely carried out. An electric double layer capacitor wherein an activated carbon is used as polarizable electrodes is excellent in electrostatic capacitance and thus the demand for the capacitor as electrodes for various electric devices has been rapidly growing, accompanying with development in the field of electronics. Further, recently in addition to downsizing of conventional memory backup power supplies, various developments of large capacity products to be used as an auxiliary power supply for motors have been carried out.

These activated carbons are generally produced by subjecting carbonaceous materials to activation using gas or chemicals, for example, alkaline activation using an alkali metal hydroxide as an activation agent and then neutralizing the activated materials by washing with a strong acid such as hydrochloric acid, nitric acid, or sulfuric acid to remove alkali metals and heavy metals.

In connection with a demand for high performance electric double layer capacitors, there have arisen needs to further decrease the alkali metals remaining in the activated carbon used as the electrodes of the capacitor. However, as described in Patent Document 1 (Japanese Patent Laid-Open Publication No. 2005-123462), the alkali metal can be removed to a certain concentration by repeatedly washing with acid or water, but further removal of the metal is difficult. Therefore, an electric double layer capacitor with a carbon material having been subjected to alkaline activation is excellent in initial capacitor capacity but has a defect concerning deterioration over time that it is large in loss of capacitor capacity after the long time use.

On the other hand, in view of washing treatment, it is desirously as simple as possible, i.e., the number of times of washing is desirously as fewer as possible to lower the cost. Patent Document 2 (International Publication No. WO2004/011371) describes that activated carbon is produced by subjecting an easily graphitizable carbonaceous material to an alkali activation treatment and then washing the resulting activated product with hot water, carbonated water, hot hydrochloric acid, aqueous ammonia, hot hydrochloric acid and hot water in this order. However, this washing treatment is tedious and thus there has arisen a strong demand of development of activated carbon with a structure enabling remaining alkali metals to be readily removed.

Needle coke is used as aggregate for graphite electrodes used in electric furnace steel making processes and is generally produced using petroleum-based heavy oil or coal tar as the raw material. In a process of producing a graphite electrode, coke particles and a binder pitch are blended at a predetermined ratio, and then kneaded while being heated, and extrusion-molded thereby producing a green electrode. The green electrode is calcined to be graphitized and fabricated thereby producing a graphite electrode product.

The graphite electrode is desirously lower in coefficient of thermal expansion (CTF) because it is used under severe conditions such as high temperature conditions. That is, a graphite electrode with a lower CTF is less consumed and thus can reduce the cost of the electric furnace steel making.

The above-mentioned graphitization is a process wherein a green electrode is heated at a temperature of about 3000° C. and in general a direct current flow furnace (LWG furnace) is used. However, graphitization carried out in the LWG furnace accelerates a temperature elevating rate and thus increases a generating rate of gas. As the result, an abnormal expansion phenomenon, so-called puffing is likely to occur. Puffing lowers the density of an electrode and also sometimes breaks the electrode.

Now, a method has been studied wherein coefficient of thermal expansion and puffing are controlled upon production of needle coke, and there have been proposed various methods. For example, Patent Document 3 (Japanese Patent Laid-Open Publication No. 5-105881) discloses a method wherein a coal tar pitch from which quinoline-insolubles has been substantially removed is blended with an oligomer adjusted in polymerization degree and coked by the delayed coking method. Patent Document 4 (Japanese Patent Laid-Open Publication No. 5-163491) discloses a method wherein a coal tar-based heavy oil and a petroleum-based heavy oil are blended at a specific ratio such that the nitrogen and sulfur contents are to be 1.0 percent by mass or less and 1.4 percent by mass or less, respectively to prepare a feedstock which is then placed into a delayed coker to produce a green coke, which is then calcined at a temperature of 700 to 900° C. and cooled, and again calcined at a temperature of 1200 to 1600° C. Patent Document 5 (Japanese Patent Laid-Open Publication No. 5-202362) discloses a method wherein upon production of coal tar by rapid thermal cracking of coal, the thermal cracking temperature in the reactor is kept at 750° C. or higher and the residence time of the thermal cracked product in the reactor is 5 seconds or shorter thereby producing a liquid product which or the pitch of which is then carbonized. Patent Document 6 (Japanese Patent Laid-Open Publication No. 7-3267) discloses a method wherein needle coke is produced by subjecting a petroleum-based heavy oil alone or a mixture thereof with a coal tar-based heavy oil from which quinoline-insolubles have been removed, as the feedstock to delayed coking and thereupon the petroleum-based heavy oil has been so adjusted that the content of particles such as ash therein is to be from 0.05 to 1 percent by mass.

However, any of the methods described in Patent Documents 3 to 6 is not necessarily sufficient in lowering coefficient of thermal expansion or inhibition of puffing and it is actual situation that the quality of the coke produced by these methods has not reached to the level required for aggregate of graphite electrodes used in electric furnace steel making processes.

DISCLOSURE OF THE INVENTION

It was found by the inventors of the present invention that an activated carbon produced by subjecting raw coke with a specific structure to alkali-activation had a structure enabling washing liquid to readily pass therethrough and consequently was capable of decreasing the content of the remaining alkali in the activated carbon and thus simplifying the washing operation.

It was also found by the inventors that a needle coke produced by calcining the foregoing raw coke was sufficiently small in coefficient of thermal expansion and capable of inhibiting puffing sufficiently.

As used herein, the term "raw coke" means a carbonized product produced by coking a feedstock such as a heavy oil or a residue, which will be a raw material of activated carbon or needle coke.

That is, the present invention relates to a raw coke having such a structure that the product resulting from graphitization of the raw coke at a temperature of 2800° C. under an inactive gas atmosphere will have ratios of the crystallite size to the lattice constant of 360 or less in the (002) plane and 1500 or less in the (110) plane.

The present invention also relates to a feedstock composition for use of the production of the raw coke, comprising a first heavy oil with an initial boiling point of 200° C. or higher produced by hydrodesulfurizing a heavy oil with a sulfur content of 2 percent by mass or more at a total pressure of 16 MPa or greater so that the hydrocracking rate will be 30 percent or less and a second heavy oil with an initial boiling point of 150° C. or higher and a sulfur content of 0.5 percent by mass or less, produced by fluidized catalytic cracking a hydrocarbon oil.

The present invention also relates to a process of producing the foregoing raw coke wherein the foregoing feedstock composition is coked at a pressure of 300 to 800 kPa and a temperature of 400 to 600° C.

The present invention also relates to an activated carbon produced by activating the foregoing raw coke or a heat-treated product produced by subjecting the foregoing raw coke to a heat treatment at a temperature of 550 to 900° C. under atmospheric pressure, with an alkali metal hydroxide.

The present invention also relates to an electric double layer capacitor containing the foregoing activated carbon as an electrode material.

The present invention also relates to a needle coke produced by calcining the foregoing raw coke at a temperature of 800 to 1600° C.

EFFECTS OF THE INVENTION

The activated carbon produced by alkali-activating the raw coke of the present invention has a structure enabling washing liquid to easily pass therethrough and thus will be decreased in the amount of the remaining alkali metal even with the same washing operation. The use of the activated carbon for electrodes of electric double layer capacitors results in an improvement in the cycle characteristics thereof. Further, the activated carbon can make washing operation simple and thus can be produced at a lower cost. Therefore, the activated carbon is extremely high in industrial value. The needle coke produced by calcining the raw coke of the present invention is sufficiently small in coefficient of thermal expansion and can inhibit puffing sufficiently.

BEST MODE OF CARRYING OUT THE INVENTION

The present invention will be described in more detail below.

The raw coke of the present invention has such a structure that the graphitized product produced by graphitization of the raw coke at a temperature of 2800° C. under an inert gas atmosphere will have ratios of the crystallite size to the lattice constant of 360 or less in the (002) plane and 1500 or less in the (110) plane. A raw coke providing ratios of the crystallite size to the lattice constant of greater than 360 in the (002) plane or greater than 1500 in the (110) plane is not preferable because it is assumed that the ratio of the edge surfaces of the crystallite of the raw coke will be less, and as the result, during washing operation, washing liquid is unable to flow into between the crystallites and becomes less effective, resulting in an increase in the amount of the remaining potassium.

Herein, the interlayer distance $d_{002}$ (lattice constant) and crystallite size $Lc_{002}$ of a microcrystal carbon are determined by the X-ray analysis in accordance with "Procedure for the measurements of lattice parameters and crystallite sizes of artificial graphite" established by the 117 Committee of Japan Society for the Promotion of Science as follows.

That is, a sample powder (produced by graphitizing a raw coke at a temperature of 2800° C.) is packed in a sample holder, and the X-ray diffraction pattern of the sample was obtained using the CuKα ray monochromatized with a graphite-monochromator as a radiation source. A peak position of the X-ray diffraction pattern is determined by the centroid method (the method of determining a centroidal position of a diffraction line and then determining a peak position with a 2θ value corresponding thereto) and calibrated using a diffraction peak of the (111) plane of high-purity silicon powder used as the standard substance. Then, the wavelength of the CuKα ray is set to 0.15418 nm and the interlayer distance $d_{002}$ of the microcrystal carbon is calculated from the following Bragg equation:

$$d_{002} = \lambda/(2 \sin \theta) \quad (1).$$

Whether or not a graphite structure is formed in the sample can be confirmed, for example, by examining whether the 2θ value has a conspicuous peak in the vicinity of 25° in the X-ray diffraction pattern of the sample. That is, graphite has a multilayer structure of layers each having a planar network structure of so-called benzene ring shape. In the measurement by the powder X-ray diffraction, a diffraction peak based on $C_{002}$ is observed as a sharp peak (2θ is around about 25°) at the interlayer distance $d_{002}$=0.335 nm. The half-value breadth (β) is measured from the diffraction pattern so as to determine the crystallite size using the following equation (2):

$$LC_{002} = 91/\beta \quad (2)$$

A product produced by heat-treating the raw coke at a temperature of 2800° C. is characterized in that it has a structure significantly similar to that of graphite when the X-ray diffraction pattern is examined.

There is no particular restriction on the feedstock or method for producing the raw coke as long as the above-described requirements are satisfied. However, the feedstock is preferably a feedstock composition which is a blend of at least two types of feedstocks selected from hydrodesulfurized oils, fluidized catalytic cracked oils, and vacuum distillation residues, produced in the process of petroleum refinery.

The feedstock composition used in the present invention preferably comprises a mixture of a heavy oil with specific properties (hereinafter referred to as "first heavy oil") produced by hydrodesulfurizing a heavy oil with a sulfur content of 2 percent by mass or more and a heavy oil with specific properties (hereinafter referred to as "second heavy oil") produced by subjecting a hydrocarbon oil to fluidized catalytic cracking.

The first heavy oil used in the present invention is a heavy oil with an initial boiling point of 200° C. or higher, produced by hydrodesulfurizing a heavy oil with a sulfur content of 2 percent by mass or more at a total pressure of 16 MPa or greater so that the hydrocracking rate is to be 30 percent or less.

The sulfur content of the heavy oil used as the feedstock of the first heavy oil is 2 percent by mass or more as described above, preferably 2.5 percent by mass or more, more preferably 3 percent by mass or more. There is no particular restriction on the upper limit, which, however, is preferably 5 percent by mass or less, more preferably 4 percent by mass or less.

There is no particular restriction on the heavy oil used as the feedstock of the first heavy oil as long as the sulfur content falls within the above-described range. Examples of the heavy oil include crude oil, atmospheric or vacuum distillation residue produced by distillation of crude oil, visbreaking oil, tar sand oil, shale oil, and mixtures of the foregoing. Preferred are atmospheric distillation residue and vacuum distillation residue.

Desulfurization for producing the first heavy oil is carried out under conditions where the total pressure is 16 MPa or greater, preferably 17 MPa or greater, more preferably 18 MPa or greater. A total pressure of less than 16 MPa results in failure to produce a heavy oil suitable as a feedstock for producing the raw coke of the present invention because cracking of the heavy oil by hydrodesulfurization excessively proceeds. There is no particular restriction on the upper limit of the total pressure. However, the total pressure is preferably 25 MPa or less, more preferably 22 MPa or less.

There is no particular restriction on conditions other than total pressure for hydrodesulfurization as long as the hydrocracking rate is to be 30 percent or less. However, various conditions are preferably set as follows. That is, the temperature for hydrodesulfurization is preferably from 300 to 500° C., more preferably from 350 to 450° C., the hydrogen/oil ratio is preferably from 400 to 3000 NL/L, more preferably from 500 to 1800 NL/L, the hydrogen partial pressure is preferably from 7 to 20 MPa, more preferably from 8 to 17 MPa, and the liquid hourly space velocity (LHSV) is preferably from 0.1 to 3 $h^{-1}$, more preferably from 0.15 to 1.0 $h^{-1}$, more preferably from 0.15 to 0.75 $h^{-1}$.

Examples of catalysts (hydrodesulfurization catalyst) used for hydrodesulfurization include Ni—Mo catalyst, Co—Mo catalyst, and combinations thereof, all of which may be those commercially available.

Among the hydrodesulfurized oils produced by the above-described dehydrosulfurization, a heavy oil having an initial boiling point of 200° C. or higher, preferably 250° C. or higher is used as the first heavy oil. There is no particular restriction on the upper limit of the initial boiling point. However, the upper limit is preferably 450° C. or lower, more preferably 400° C. or lower.

The sulfur content of the first heavy oil is preferably 0.5 percent by mass or less, more preferably 0.4 percent by mass or less, more preferably 0.35 percent by mass or less, particularly preferably 0.3 percent by mass or less, most preferably 0.25 percent by mass or less. The first heavy oil with a sulfur content of more than 0.5 percent by mass is not preferable because it is likely to invite early coking, resulting in a raw coke with a coke structure with a poor crystallinity, causing an increase in the remaining alkali metal content in an activated carbon produced by alkali-activating the raw coke and needle coke produced by calcining the raw coke is likely to cause puffing.

The asphalten content of the first heavy oil is preferably 5 percent by mass or less, more preferably 4 percent by mass or less, more preferably 3 percent by mass or less. The first heavy oil with an asphalten content of more than 5 percent by mass is not preferable because coking will proceed too early, resulting in a raw coke with a coke structure with a poor crystallinity, causing an increase in the remaining alkali metal content of an activated carbon produced by alkali-activating the raw coke and needle coke produced by calcining the raw coke will be high in coefficient of thermal expansion.

The saturate content of the first heavy oil is preferably 60 percent by mass or more, more preferably 65 percent by mass or more, more preferably 70 percent by mass or more. The upper limit of the saturate content is preferably 85 percent by mass or less, more preferably 80 percent by mass or less. The first heavy oil with a saturate content of less than 60 percent by mass is not preferable because the alignability to mesophase will be poor and the resulting raw coke will have a coke structure with a poor crystallinity.

The density at 15° C. of the first heavy oil is preferably from 0.85 to 0.89 g/cm³.

The second heavy oil used in the present invention is a heavy oil with an initial boiling point of 150° C. or higher and a sulfur content of 0.5 percent by mass or less, produced by subjecting a hydrocarbon oil to fluidized catalytic cracking.

The term "fluidized catalytic cracking" means a process of cracking a high boiling point distillate with a solid acid catalyst. The fluidized catalytic cracking unit used in such a process is also referred to as "FCC unit".

There is no particular restriction on the hydrocarbon oil that is the feedstock of the second heavy oil as long as a heavy oil with an initial boiling point and sulfur content satisfying the above requirements can be produced by subjecting the hydrocarbon oil to fluidized catalytic cracking. However, it is preferred to use those with a density at 15° C. of 0.8 g/cm³ or greater.

Examples of such hydrocarbon oils include straight-run gas oil, vacuum gas oil, desulfurized gas oil, desulfurized vacuum gas oil, atmospheric distillation residue, vacuum distillation residue, shale oil, tar sand bitumen, Orinoco tar, coal liquid, those produced by hydro-refining these oils, and mixtures thereof. In the present invention, it is particularly preferred to use vacuum gas oil and desulfurized vacuum gas oil.

There is no particular restriction on the conditions of fluidized catalytic cracking as long as a heavy oil with an initial boiling point and sulfur content satisfying the above-described requirements is produced. For example, preferably the reaction temperature is from 480 to 550° C., the total pressure is from 1 to 3 kg/cm²G (98 to 294 kPa gauge pressure) the catalyst/oil ratio is from 1 to 20 wt/wt, and the contact time is from 1 to 10 seconds.

Examples of catalysts used in fluidized catalytic cracking include silica/alumina catalyst, zeolite catalyst, and those supporting a metal such as platinum on these catalysts. These catalysts may be those commercially available.

The initial boiling point of the second heavy oil thus produced is necessarily 150° C. or higher, preferably 200° C. or higher, more preferably 220° C. or higher. The second heavy oil with an initial boiling point of lower than 150° C. is not preferable because the yield of a raw coke is reduced and the raw coke has a non-crystalline structure causing an increase in the remaining alkali metal content in an activated carbon produced by alkali-activating the raw coke and an increase in the coefficient of thermal expansion of needle coke produced by calcining the raw coke. The upper limit of the initial boiling point is 350° C. or lower, more preferably 300° C. or lower.

The sulfur content of the second heavy oil is necessarily 0.5 percent by mass or less, preferably 0.4 percent by mass or less, more preferably 0.3 percent by mass. The second heavy oil with a sulfur content of more than 0.5 percent by mass is not preferable because it is likely to invite early coking, resulting in a raw coke with a coke structure with a poor crystallinity, causing an increase in the remaining alkali metal content in an activated carbon produced by alkali-activating the raw coke and insufficient inhibition of puffing in needle coke produced by calcining the raw coke.

There is no particular restriction on the nitrogen content of the second heavy oil. However, the nitrogen content is preferably 0.2 percent by mass or less, more preferably 0.15 percent by mass or less, more preferably 0.1 percent by mass or less. The second heavy oil with a nitrogen content of more than 0.2 percent by mass would fail to inhibit the resulting needle coke from puffing sufficiently.

The feedstock composition of the present invention is suitably produced by mixing the above-described first and second heavy oils. The feedstock composition of the present invention may in addition to the first and second heavy oils be mixed with a vacuum distillation residue.

The vacuum distillation residue is preferably a heavy oil with an initial boiling point of 300° C. or higher, an asphalten content of 12 percent by mass or less, a saturate content of 50 percent by mass or more, and a sulfur content of 0.3 percent by mass or more, which is produced as residue upon vacuum distillation of petroleum-based oils. Examples of such petroleum-based oils include crude oil, vacuum distillation residue produced upon distillation thereof, and mixtures of the foregoing. There is no particular restriction on the conditions for vacuum distillation of these petroleum-based oils as long as the resulting vacuum distillation residue satisfies the above requirements in terms of the boiling point, asphalten content and sulfur content. However, the pressure is preferably 30 kPa or lower while the temperature is 400° C. or higher.

With regard to the mix ratio of the first and second heavy oils for the production of activated carbon to be used for an electrode of an electric double layer capacitor, they are mixed so that the ratio of the first heavy oil in the resulting feedstock composition is preferably 5 percent by mass or more, more preferably 10 percent by mass or more, more preferably 15 percent by mass or more, and preferably 95 percent by mass or less, more preferably 90 percent by mass or less, more preferably 85 percent by mass or less. With regard to the mix ratio of the first and second heavy oils for the production of the raw coke for needle coke, they are mixed so that the first heavy oil is contained in an amount of preferably 1 to 50 percent by mass, more preferably 5 to 50 percent by mass, more preferably 15 to 50 percent by mass.

When the first and second heavy oils are combined with a vacuum distillation residue, the latter is blended so that the content thereof will be preferably 10 percent by mass or more, more preferably 20 percent by mass or more, more preferably 30 percent by mass or more and preferably 70 percent by mass or less, more preferably 60 percent by mass or less, more preferably 50 percent by mass or less. In this case, each of the first and second heavy oils is blended so that the content of each oil will be 10 percent by mass or more.

In the next procedure, the feedstock composition of the present invention is subjected to coking.

Examples of methods for coking the feedstock composition include delayed coking, visbreaking, flexicoking, Eureka process, and H-Oil. Amongst, particularly preferred is delayed coking.

In delayed coking, the feedstock composition is placed into a delayed coker and heated under pressure. The pressure in the delayed coker is preferably from 300 to 800 kPa. The temperature in the delayed coker is preferable from 400 to 600° C., more preferably from 450 to 550° C. The residence time is preferably from 24 to 72 hours, more preferably from 36 to 60 hours.

As the result of the coking, a carbonized product (green coke) that will be raw coke is produced.

The raw coke of the present invention has such a structure that when it is graphitized at a temperature of 2800° C. under an inert gas atmosphere, the resulting graphitized product will have ratios of the crystallite size to the lattice constant of 360 or less, preferably 350 or less and 1500 or less, preferably 1300 or less, in the (002) plane and (110) plane, respectively.

The sulfur content of the raw coke of the present invention is usually 0.3 percent by mass or less while the bulk specific gravity is usually 0.55 or greater.

The raw coke of the present invention is to be such that when it is graphitized at a temperature of 2800° C. under an inert gas atmosphere, the resulting graphitized product will have a bulk specific gravity of preferably 2.23 or greater, more preferably 2.24 or greater. A bulk specific gravity of smaller than 2.23 is not preferable because crystallites are disorderly aligned and thus edged surfaces are kept closed at their respective crystallite surfaces.

In the present invention, when the first heavy oil alone or a mixture of the first and second heavy oils is heated at a temperature of 500° C., the ratio of mosaic texture of 10 μm or smaller present in the raw coke is small such as 2 percent or less, preferably 1 percent or less. The smaller ratio of mosaic texture of 10 μm or smaller in a raw coke means herein that the growth condition of a liquid crystal referred to as mesophase is excellent. The mesophase is an intermediate product resulting from polycondensation and thermal decomposition occurring, accompanied with heat treatment of the feedstock and is produced as the result of development of a range of aromatic rings along the same plane.

The mosaic texture in a raw coke is measured in accordance with the description at page 147 in "Basic Carbonization Engineering" by Yuzo Sanada and Sugiro Otani published by Ohmsha Ltd.

So far, it has been assumed that a feedstock with a large saturate content, in particular a large aliphatic content causes crosslinking in addition to polymerization and polycondensation of aromatic components upon coking and thus the three dimensioned-crystal grows, resulting in insufficient growth of mesophase and a structure with a poor crystallinity and thus the coefficient of thermal expansion of the resulting needle coke would be increased and further the remaining alkali metal content in the resulting activated carbon would be increased. Taking account of this, it is surprising that coke with no mosaic texture of 10 μm or smaller or 2 percent or less thereof, if present, can be produced even though the saturate content of the first heavy oil is 50 percent by mass or more.

The raw coke produced by coking can be converted to activated carbon by alkali-activation. When the raw coke is alkali-activated, the alkali-activation is preferably carried out once the raw coke is subjected to heat treatment under an inert atmosphere and an atmospheric pressure at a temperature of 550 to 900° C., preferably 600 to 850° C.

In the present invention, the activated carbon thus produced is used as an electrode material for electric double layer capacitors.

The raw coke or heat-treated product thereof may be activated by heating it together with a metal hydroxide under a nitrogen gas or inert gas atmosphere at a temperature of 500 to 1200° C. in an activation furnace. Examples of the metal hydroxide include alkali metal hydroxides such as potassium hydroxide, sodium hydroxide and lithium hydroxide and alkaline earth metals hydroxides such as magnesium hydroxide and barium hydroxide. These metal hydroxides may be used alone or in combination. Among these metal hydroxides, potassium hydroxide is preferably used because it can form micro pores efficiently.

The amount of the raw coke or heat-treated product thereof and a metal hydroxide is defined by the mass ratio thereof, which may be from 1/0.5 to 1/10, preferably from 1/1 to 1/5.

A mass ratio of the raw coke or heat-treated product thereof to a metal hydroxide of 1/0.5 or smaller renders it possible to produce activated carbon with sufficient number of micro pores and sufficiently large surface area. A mass ratio of the raw coke or heat-treated product thereof to a metal hydroxide of 1/10 or larger renders it possible to carry out activation efficiently without reducing the bulk density.

In the activation reaction, the raw coke or heat-treated product thereof and a metal hydroxide may coexist with water or the like.

In activation of the raw coke or heat-treated product thereof, the activation temperature may be from 500 to 1200° C., preferably 600 to 1000° C., more preferably 600 to 800° C. The activation temperature within these ranges renders it possible to efficiently produce activated carbon with sufficient number of micro pores. The activation time may be properly selected in connection with conditions such as temperature and may be, for example, from 3 to 6 hours.

Examples of the inert gas used in activation include inert gas and nitrogen gas. The inert gas is preferably supplied so that the oxygen concentration in the activation atmosphere can be kept at 100 ppm by volume or less.

Washing of the activated product is carried out to separate the solid and liquid by washing the activated product with washing liquid and may be a method wherein the activated product is dipped in and mixed with washing liquid if necessary by stirring and heating and then the washing liquid is removed. The washing liquid is preferably water or an acid aqueous solution. For example, the activated product may be washed with any appropriate combination of such as water, acid aqueous solution and again water. Examples of the acid aqueous solution include halogenated hydracid such as hydrochloric acid, hydriodic acid and hydrobromic acid and inorganic acids such as sulfuric acid and carbonic acid. The concentration of the acid aqueous solution may be from 0.01 to 3 N. Washing using these washing liquids may be repeated a plurality of times if necessary.

After the final washing with the foregoing washing liquid in the washing operation, the solid is separated from the washing liquid and then as appropriate heated and air-dried to remove the moisture thereby obtaining activated carbon.

The activated carbon produced by alkali-activating the raw coke produced or a heat-treated product thereof is characterized in that it is less in the amount of the remaining alkali metal than the conventional activated carbon when they are washed in the same manner. It is assumed that the reason why the remaining alkali metal amount is decreased is that the raw coke of the present invention and a heat-treated product thereof have a crystalline structure wherein the metal hydroxide of an activating agent and washing liquid readily pass through the raw coke or heat-treated product thereof.

In addition, the activated carbon of the present invention when used as an electrode of an electric double layer capacitor is characterized in that the electrolyte ions are likely to pass therethrough upon charging and discharging and thus the electrode is improved in electrostatic capacitance retention rate as evaluated by a cycle characteristic test.

The electric double layer capacitor of the present invention contains electrodes comprising the activated carbon made from the raw coke of the present invention or a heat-treated product thereof.

There is no particular restriction on the electrode of the electric double layer capacitor of the present invention as long as it contains the above-described activated carbon. The electrode may contain a binder, a conducting agent and the like and be integral with a collector.

The binder may be any conventional one. Specific examples include polyolefins such as polyethylene and polypropylene; fluorinated polymers such as polytetrafluoroethylene, polyvinylidene fluoride and crosslinked fluoroolefin/vinyl ether copolymer; celluloses such as carboxymethyl cellulose; vinyl-based polymers such as polyvinyl pyrrolidone and polyvinyl alcohol; and polyacrylic acid. The content of the binder in the electrode may be from 0.1 to 30 percent by mass.

Specific examples of the conducting agent include powdery materials of such as carbon black, acetylene black and graphite powder. The content of the conducting agent is preferably from 1 to 50 percent by mass, more preferably from 2 to 30 percent by mass.

Examples of methods of producing electrodes using these materials include those wherein the foregoing activated carbon, binder and conductive material are added in a solvent capable of dissolving the binder to make slurry and coated on a sheet-like collector and wherein without using such a solvent, the foregoing activated carbon, binder and conducting agent are kneaded and press-molded at ambient temperature or elevated temperatures.

The collector may be any of those made of known materials and with conventional shapes. Specific examples of the collector include metals such as aluminum, titanium, tantalum and nickel and alloys such as stainless steel.

The electric double layer capacitor of the present invention may be produced as a unit cell wherein a pair of the electrodes as described above, one of which is a positive electrode and the other of which is a negative electrode are arranged via a separator to face one another and dipped in an electrolytic solution. The separator may be a non-woven cloth made of polypropylene fiber or glass fiber or a cellulose paper.

The electrolytic solution may be an aqueous or non-aqueous electrolytic solution but is preferably a non-aqueous electrolytic solution. Examples of the non-aqueous solution include those produced by dissolving an electrolyte in an organic solvent. Specific examples of the solvent include propylene carbonate, ethylene carbonate, butylene carbonate, γ-butyrolactone, sulfolane, sulfolane derivatives such as 3-methylsulfolane, dimethoxyethane such as 1,2-diemthoxyethane, acetonitrile, glutaronitrile, valeronitrile, dimethylformamide, dimethylsulfoxide, tetrahydrofuran, methyl formate, dimethyl carbonate, diethyl carbonate, ethylmethyl carbonate. These solvents may be used alone or in combination. Examples of the electrolyte of the electrolytic solution include inorganic ion salts such as alkali metal salts and alkaline earth metal salts; quaternary ammonium salts; cyclic quaternary ammonium salts; and quaternary phosphonium salts. Specific examples include $(C_2H_5)_4NBF_4$, $(C_2H_5)_3(CH_3) NBF_4$, $(C_2H_5)_4PBF_4$, and $(C_2H_5)_3(CH_3) PBF_4$. The electrolyte concentration in the electrolytic solution may be from 0.1 to 5 mol/L, and is preferably from 0.5 to 5 mol/L.

The electric double layer capacitor of the present invention may take any shape such as a coin type wherein a pair of sheet- or disc-shaped electrodes with a thickness of 50 to 500 μm and a separator disposed therebetween are accommodated in a metal case, a rolled up type wherein a pair of electrodes are rolled up via a separator, and a laminate type wherein a plurality of pairs of electrodes including a separator are arranged in a multi-layer structure.

The electric double layer capacitor of the present invention exhibits improved cycle characteristics and excellent durability and capacity retention rate due to the use of the above-described electrode.

The above-described raw coke of the present invention can be converted to needle coke by calcining it in a rotary kiln or a shaft kiln. The calcination temperature is preferably from 800 to 1600° C., more preferably from 1000 to 1500° C. The calcination time is usually from 1 to 10 hours, preferably from 2 to 6 hours.

Preferably, the needle coke of the present invention contains sulfur in an amount of 0.5 percent by mass or less and nitrogen in an amount of 0.1 percent by mass or less and has a specific bulk gravity of 0.83 or greater.

The needle coke of the present invention is sufficiently small in coefficient of thermal expansion and inhibited in puffing sufficiently.

Conventionally, the use of a puffing inhibitor has been known as a method of inhibiting puffing. However, the puffing inhibitor possibly becomes an impurity which adversely affects the quality (in particular coefficient of thermal expansion and density) of the electrode. Whereas, the needle coke of the present invention is advantageous in that it can sufficiently inhibit puffing and be sufficiently lowered in coefficient of thermal expansion without using such a puffing inhibitor.

The needle coke of the present invention is suitably used as aggregate of graphite electrodes for electric furnace steel making. Examples of the method of producing a graphite electrode product using the needle coke include those wherein a raw material that is a blend of the needle coke of the present invention and a binder pitch added thereto in a suitable amount is kneaded while being heated and then extruded thereby producing a green electrode, which is then graphitized by calcination and fabricated.

The term "sulfur content" used herein means the values measured in accordance with JIS K 2541 for oil and JIS M8813 for coke, respectively. The term "nitrogen content" used herein means the values measured in accordance with JIS K2609 for oil and JIS M8813 for coke, respectively. The terms "saturate content" and "asphalten content" used herein means the values measured using a thin-layer chromatography.

APPLICABILITY IN THE INDUSTRY

The raw coke of the present invention is suitably used for the production of activated carbon for electrodes of electric double layer capacitors and also for the production of needle coke.

EXAMPLES

The present invention will be described in more details with reference to the following examples but is not limited thereto.

Example 1

(1) Preparation of Feedstock Composition

A middle east origin atmospheric distillation residue with a sulfur content of 2.5 percent by mass was hydrodesulfurized in the presence of Ni—Mo catalyst so that the hydrocracking rate would be 25 percent or less thereby producing a desulfurized heavy oil (hereinafter referred to as "hydrodesulfurized oil A"). The hydrodesulfurization was carried out under conditions wherein the total pressure was 22 MPa, the hydrogen partial pressure was 20 MPa, the temperature was 380° C., the hydrogen/oil ratio was 590 NL/L, and the liquid hourly space velocity (LHSV) was $0.17\ h^{-1}$.

A vacuum distillation residue and a desulfurized vacuum gas oil were used as a feedstock and reacted using a catalyst that is a silica alumina supporting platinum (Pt) at a reaction temperature of 520° C., a total pressure of 0.2 MPa and a catalyst/oil ratio of 7 for a contact time of 3 seconds thereby producing a fluidized catalytic cracked residue (hereinafter referred to as "fluidized catalytic cracked residue A").

Thereafter, the hydrodesulfurized oil A and fluidized catalytic cracked residue A were mixed at a mass ratio of 5:5 thereby producing a feedstock composition A.

(2) Preparation of Raw Coke

The feedstock composition A thus produced was coked at a pressure of 400 kPa and a temperature of 500° C. under nitrogen for 40 hours thereby producing coke (raw coke A). The raw coke A thus produced was heated at a temperature of 2800° C. under nitrogen thereby producing a graphitized product. The graphitized product was subjected to the X-ray diffraction measurement (see "GAKUSHIN" method established by the 117 Committee of the Japan Society for the Promotion of Sciences) and the results are set forth in Table 1 below.

(3) Activation of Raw Coke

A mixture of 1 part by mass of the raw coke A and 2.5 parts by mass of potassium hydroxide (KOH) was placed into a nickel reaction vessel and activated by heating at a temperature of 700° C. under nitrogen for one hour.

After the activation, the reaction mixture in the vessel was cooled to a temperature of 250° C. and carbon dioxide was flowed instead of nitrogen to deactivate the metal potassium. Thereafter, 20 kg of water was added to 2 kg of the reaction product and then stirred at room temperature for one hour and filtered under pressure. This procedure was repeated twice. Then, 20 kg of a 0.3 N hydrochloric acid solution was added to the resulting product and then stirred for 3 hours and filtered under pressure. After further addition of 20 kg of water, the mixture was stirred for one hour and filtered under pressure. This procedure was also repeated twice. The solid thus produced was dried at a temperature of 130° C. thereby producing an activated carbon for an electric double layer capacitor. The specific surface area, remaining potassium amount and true specific gravity of the activated carbon are set forth in Table 2 below.

(4) Preparation of an Electric Double Layer Capacitor

The activated carbon (0.8 g), ketjen black (0.1 g) and polytetrafluoroethylene (0.1 g) were mixed in a mortar. The mixture was sandwiched between two sheets of triacetate film with a thickness of 0.1 mm and rolled by being passed through between a pair of 160 mm width nip rollers with the gap therebetween of 0.7 mm, applying a pressing force of 23.0 MPa, this pressing being repeated 20 times. Two sheets in circular shape of a diameter of 16 mm were punched out from the rolled sheet and used as carbon electrodes. The carbon electrodes were dried in a vacuum dryer for 2 hours.

The two electrodes were impregnated with an electrolytic solution (1 mole of $(C_2H_5)_3(CH_3)NBF_4$ was dissolved in 1 liter of propylene carbonate). Between the electrodes was sandwiched a cellulose separator with a thickness of 50 μm, and the electrode with the separator were placed and enclosed in an SUS 316 coin-type cell with a diameter of 20 mm. Thereupon, collectors were each prepared by coating a carbon coating as a collector over a surface of a sheet of aluminum foil with a thickness of 20 μm and then were each sandwiched between the cell and the carbon electrodes so that the coated surface faces the carbon electrodes.

The electrostatic capacitance and cycle characteristics (retention rate of electrostatic capacitance after repeating charging and discharging 1000 times) of the electric double layer capacitor thus produced are set forth in Table 2.

Example 2

An atmospheric distillation residue with a sulfur content of 3.0 percent by mass was vacuum-distilled under conditions where the furnace outlet temperature was 360° C. and the pressure was 1.3 kPa thereby producing a vacuum distillation residue A with an initial boiling point of 410° C., an asphalten content of 8 percent by mass, a saturate content of 50 percent by mass, a sulfur content of 0.1 percent by mass and a nitrogen content of 0.3 percent by mass.

The vacuum distillation residue A thus produced was mixed with the hydrodesulfurized oil A and fluidized catalytic cracked residue A produced in Example 1 so that the content of the former would be 30 percent by mass thereby producing a feedstock composition B.

The feedstock composition B thus produced was coked at a pressure of 400 kPa and a temperature of 500° C. under nitrogen for 40 hours thereby producing coke (raw coke B). The raw coke B thus produced was heated at a temperature of 2800° C. under nitrogen thereby producing a graphitized product. The graphitized product was subjected to the X-ray diffraction measurement (see "GAKUSHIN" method established by the 117 Committee of the Japan Society for the Promotion of Sciences) and the results are set forth in Table 1 below.

The same procedures of Example 1 were repeated to carry out activation and prepare a capacitor except for using the raw coke B in place of the raw coke A. The specific surface area, remaining potassium amount and true specific gravity of the activated carbon thus produced and the electrostatic capacitance and cycle characteristics (retention rate of electrostatic capacitance after repeating charging and discharging 1000 times) of the electric double layer capacitor thus produced are set forth in Table 2.

Comparative Example 1

The fluidized catalytic cracked residue A produced in Example 1 was coked at a pressure of 400 kPa and a temperature of 500° C. under nitrogen for 40 hours thereby producing coke. The coke thus produced was heated at a temperature of 2800° C. under nitrogen. The heat-treated product was subjected to the X-ray diffraction measurement (see "GAKUSHIN" method established by the 117 Committee of the Japan Society for the Promotion of Sciences) and the results are set forth in Table 1 below. The coke was subjected to alkali-activation under the same conditions as those of Example 1 thereby producing an activated carbon. The specific surface area, remaining potassium amount and true specific gravity of the activated carbon thus produced and the electrostatic capacitance and cycle characteristics (retention rate of electrostatic capacitance after repeating charging and discharging 1000 times) of the electric double layer capacitor thus produced are set forth in Table 2.

Comparative Example 2

The vacuum distillation residue A produced in Example 2 was coked at a pressure of 400 kPa and a temperature of 500° C. under nitrogen for 40 hours thereby producing coke. The coke thus produced was heated at a temperature of 2800° C. under nitrogen. The heat-treated product was subjected to the X-ray diffraction measurement (see "GAKUSHIN" method established by the 117 Committee of the Japan Society for the Promotion of Sciences) and the results are set forth in Table 1 below. The coke was subjected to alkali-activation under the same conditions as those of Example 1 thereby producing an activated carbon. The specific surface area, remaining potassium amount and true specific gravity of the activated carbon thus produced and the electrostatic capacitance and cycle characteristics (retention rate of electrostatic capacitance after repeating charging and discharging 1000 times) of the electric double layer capacitor thus produced are set forth in Table 2.

It is apparent from the results set forth in Tables 1 and 2 that when the ratios of the crystallite size to the lattice constant of the products having been heat-treated at a temperature of 2800° C. are 360 or less and 1500 or less in the (002) and (110) planes, respectively, the activated carbons produced by activation with KOH are less in the remaining potassium amount, and the electric double layer capacitors produced using the activated carbons are high in cycle characteristics, i.e., retention rate of electrostatic capacitance after repeating charging and discharging times and are thus excellent in capacitance characteristics.

TABLE 1

| | Ratio of crystallite size to lattice constant | |
|---|---|---|
| | hkl (002) plane | hkl (110) plane |
| Example 1 | 342 | 1214 |
| Example 2 | 327 | 1137 |
| Comparative Example 1 | 399 | 1665 |
| Comparative Example 2 | 381 | 1686 |

TABLE 2

| | Specific surface area m²/g | Remaining potassium K mass ppm | True specific gravity | Electrostatic capacitance F/CC | Cycle characteristics* % |
|---|---|---|---|---|---|
| Example 1 | 1900 | 20 | 2.25 | 27 | 93 |
| Example 2 | 2000 | 18 | 2.25 | 27 | 93 |
| Comparative Example 1 | 1800 | 140 | 2.25 | 27 | 86 |
| Comparative Example 2 | 2200 | 100 | 2.22 | 22 | 81 |

*retention rate of electrostatic capacitance after 1000 cycles

Example 3

(1) Preparation of Feedstock Composition

An atmospheric distillation residue with a sulfur content of 3.5 percent by mass was hydrodesulfurized in the presence of Ni—Mo catalyst so that the hydrocracking rate would be 30 percent or less thereby producing a desulfurized heavy oil (hereinafter referred to as "hydrodesulfurized oil B"). The hydrodesulfurization was carried out under conditions wherein the total pressure was 18.5 MPa, the hydrogen partial pressure was 16.5 MPa, the temperature was 370° C., the hydrogen/oil ratio was 590 NL/L, and the liquid hourly space velocity (LHSV) was 0.17 h$^{-1}$. The hydrodesulfurized oil B thus produced had an initial boiling point of 260° C., a sulfur content of 0.3 percent by mass, a nitrogen content of 0.1 percent by mass, an asphalten content of 2 percent by mass, and a saturate content of 70 percent by mass.

The hydrodesulfurized oil B was placed into a test tube and heated at atmospheric pressure and a temperature of 500° C. for 3 hours to be coked. The coke thus produced was embedded into a commercially available resin and observed through a polarized microscope. No mosaic texture of 10 μm or smaller was found.

Separately, a desulfurized vacuum gas oil (sulfur content: 500 ppm by mass, density at 15° C.: 0.88 g/cm$^3$) was subjected to fluidized catalytic cracking thereby producing a fluidized catalytic cracked residue (hereinafter referred to as "fluidized catalytic cracked residue B"). The fluidized catalytic cracked residue B thus produced had an initial boiling point of 210° C., a sulfur content of 0.1 percent by mass, a nitrogen content of 0.1 percent by mass, an asphalten content of 0 percent by mass and a saturate content of 30 percent by mass.

The fluidized catalytic cracked residue B was placed into a test tube and heated at atmospheric pressure and a temperature of 500° C. for 3 hours to be coked. The coke thus produced was embedded into a commercially available resin and observed through a polarized microscope. As the result, no mosaic texture of 10 μm or smaller was found.

(2) Preparation of Raw Coke

Next, the hydrodesulfurized oil B and fluidized catalytic cracked residue B were mixed at a mass ratio of 2:8 thereby producing a feedstock composition C. The feedstock composition C thus produced was coked at a pressure of 400 kPa and a temperature of 500° C. for 40 hours thereby producing coke (raw coke C). The raw coke C thus produced was embedded into a commercially available resin and observed through a polarized microscope. As the result, no mosaic texture of 10 μm or smaller was found.

(3) Activation of Raw Coke

A mixture of 1 part by mass of the raw coke C and 2.5 parts by mass of potassium hydroxide (KOH) was placed into a nickel reaction vessel and activated by heating at a temperature of 750° C. under nitrogen for one hour.

After the activation, the reaction mixture in the vessel was cooled to a temperature of 300° C. and carbon dioxide was flowed instead of nitrogen to deactivate the metal potassium. Thereafter, 20 kg of water was added to 2 kg of the reaction product and then stirred at room temperature for one hour and filtered under pressure. This procedure was repeated twice. Then, 20 kg of 0.3 N hydrochloric acid was added to the resulting product and then stirred for 3 hours and filtered under pressure. After further addition of 20 kg of water, the mixture was stirred for one hour and filtered under pressure. This procedure was also repeated twice. The solid thus produced was dried at a temperature of 130° C. thereby producing an activated carbon for an electric double layer capacitor.

The specific surface area and remaining potassium amount of the activated carbon are set forth in Table 3 below.

(4) Preparation of an Electric Double Layer Capacitor

An electric double layer capacitor was produced with the same procedures as those in Example 1 except for using the activated carbon thus produced. The electrostatic capacitance and cycle characteristics (retention rate of electrostatic capacitance after repeating charging and discharging 1000 times) of the electric double layer capacitor thus produced are set forth in Table 3.

Example 4

The hydrodesulfurized oil B and fluidized catalytic cracked residue B were mixed at a mass ratio of 8:2 thereby producing a feedstock composition D. The feedstock composition D thus produced was coked at a pressure of 400 kPa and a temperature of 500° C. for 40 hours thereby producing coke (raw coke D). The procedures of Example 3 were repeated except that a mixture of 1 part by mass of the raw coke D and 2.5 parts by mass of potassium hydroxide (KOH) was placed into a nickel reaction vessel and activated by heating at a temperature of 750° C. under nitrogen for one hour thereby producing an activated carbon for an electric double layer capacitor. The specific surface area and remaining potassium amount of the activated carbon are set forth in Table 3 below. An electric double layer capacitor was prepared with the same procedures of Example 1 using the activated carbon thus produced. The electrostatic capacitance and cycle characteristics (retention rate of electrostatic capacitance after repeating charging and discharging 1000 times) of the electric double layer capacitor thus produced are set forth in Table 3.

Comparative Example 3

Only the fluidized catalytic cracked residue B produced in Example 3 was coked at a pressure of 400 kPa and a temperature of 500° C. for 40 hours and then activated with the same procedures of Example 3, and an electric double layer capacitor was prepared using the activated carbon thus produced. The specific surface area and remaining potassium amount of the activated carbon and the electrostatic capacitance and cycle characteristics (retention rate of electrostatic capacitance after repeating charging and discharging 1000 times) of the electric double layer capacitor thus produced are set forth in Table 3.

Comparative Example 4

An atmospheric distillation residue (a density of 0.92 g/cm$^3$ and a sulfur content of 0.35 percent by mass) was vacuum-distilled under conditions where the furnace outlet temperature was 350° C. and the pressure was 1.3 kPa thereby producing a vacuum distillation residue with an initial boiling point of 410° C., an asphalten content of 9 percent by mass, a saturate content of 61 percent by mass and a sulfur content of 0.1 percent by mass (hereinafter referred to as "vacuum distillation residue B"). The vacuum distillation residue B was heated at a pressure of 400 kPa and a temperature of 500° C. for 40 hours to be coked and then activated with the same procedures of Example 3 and an electric double layer capacitor was prepared using the activated carbon thus produced. The specific surface area and remaining potassium amount of the activated carbon and the electrostatic capacitance and cycle characteristics (retention rate of electrostatic capacitance after repeating charging and discharging 1000 times) of the electric double layer capacitor thus produced are set forth in Table 3.

As apparent from the results set forth in Table 3, the use of the feedstock compositions produced by mixing a hydrodesulfurized oil and a fluidized catalytic cracked residue of the present invention renders it possible to reduce drastically the remaining potassium amount in the resulting activated carbons and as the result improve the retention rate of electrostatic capacitance of the electric double layer capacitors produced using the activated carbons.

400 kPa and a temperature of 500° C. for 40 hours to be coked thereby producing coke (raw coke F). The raw coke F thus produced was embedded into a commercially available resin and observed through a polarized microscope. No mosaic texture of 10 μm or smaller was found. The raw coke F was heated at a temperature of 2800° C. under a nitrogen atmosphere thereby producing a graphitized product. The graphitized product was subjected to the X-ray diffraction measurement (see "GAKUSHIN" method established by the 117 Committee of the Japan Society for the Promotion of Sciences) and the results are set forth in Table 4 below.

TABLE 3

|  | Example 3 | Example 4 | Comparative Example 3 | Comparative Example 4 |
|---|---|---|---|---|
| Feedstock composition | Feedstock composition C (Mixture of hydrodesulfurized oil B and fluidized catalytic cracked residue B at a ratio of 2:8) | Feedstock composition D (Mixture of hydrodesulfurized oil B and fluidized catalytic cracked residue B at a ratio of 8:2) | Fluidized catalytic cracked residue B | Vacuum distillation residue B |
| Activated carbon |  |  |  |  |
| Specific surface area m²/g | 1800 | 2100 | 1800 | 2200 |
| Remaining potassium amount ppm | 22 | 18 | 140 | 120 |
| Electric double layer capacitor |  |  |  |  |
| Capacitance F/CC | 26 | 27 | 27 | 25 |
| Retention rate of capacitance % | 93 | 92 | 87 | 89 |

Example 5

The hydrodesulfurized oil B and fluidized catalytic cracked residue B produced in Example 3 were mixed at a mass ratio of 1:3 thereby producing a feedstock composition E. The feedstock composition E thus produced was placed into a test tube and heated at a pressure of 400 kPa and a temperature of 500° C. for hours to be coked thereby producing coke (raw coke E). The raw coke E thus produced was embedded into a commercially available resin and observed through a polarized microscope. No mosaic texture of 10 μm or smaller was found. The raw coke E was heated at a temperature of 2800° C. under a nitrogen atmosphere thereby producing a graphitized product. The graphitized product was subjected to the X-ray diffraction measurement (see "GAKUSHIN" method established by the 117 Committee of the Japan Society for the Promotion of Sciences) and the results are set forth in Table 4 below.

Thereafter, the raw coke E was calcined at a temperature of 1000° C. for 5 hours thereby producing calcined coke. The sulfur and nitrogen contents and bulk specific gravity of the calcined coke thus produced are set forth in Table 5.

The calcined coke was blended with 30 percent by mass of a coal-based binder pitch and formed into a cylindrical piece through an extruder. The piece was calcined at a temperature of 1000° C. for one hour in a muffle furnace. Thereafter, the coefficient of thermal expansion of the calcined piece was measured. Further, the piece was heated from room temperature to a temperature of 2800° C. and the degree of expansion during the heating was measured as puffing. The results are set forth in Table 5.

Example 6

The hydrodesulfurized oil B and fluidized catalytic cracked residue B were mixed at a mass ratio of 1:5 thereby producing a feedstock composition F. The feedstock composition F was placed into a test tube and heated at a pressure of 400 kPa and a temperature of 500° C. for 40 hours to be coked thereby producing coke (raw coke F). The raw coke F thus produced was embedded into a commercially available resin and observed through a polarized microscope. No mosaic texture of 10 μm or smaller was found. The raw coke F was heated at a temperature of 2800° C. under a nitrogen atmosphere thereby producing a graphitized product. The graphitized product was subjected to the X-ray diffraction measurement (see "GAKUSHIN" method established by the 117 Committee of the Japan Society for the Promotion of Sciences) and the results are set forth in Table 4 below.

Thereafter, the raw coke F was calcined at a temperature of 1000° C. for 5 hours thereby producing calcined coke. The sulfur and nitrogen contents and bulk specific gravity of the calcined coke thus produced are set forth in Table 5.

A cylindrical piece was produced with the same procedures of Example 5 except for using the calcined coke thus produced to measure the coefficient of thermal expansion and puffing. The results are set forth in Table 5.

Comparative Example 5

The fluidized catalytic cracked residue B was placed into a test tube and heated at a pressure of 400 kPa and a temperature of 500° C. for 40 hours to be coked. The coke was heated at a temperature of 2800° C. under a nitrogen atmosphere thereby producing a graphitized product. The graphitized product was subjected to the X-ray diffraction measurement (see "GAKUSHIN" method established by the 117 Committee of the Japan Society for the Promotion of Sciences) and the results are set forth in Table 4 below.

Thereafter, the coke thus produced was calcined at a temperature of 1000° C. for 5 hours thereby producing calcined coke. The sulfur and nitrogen contents and bulk specific gravity of the calcined coke thus produced are set forth in Table 5.

A cylindrical piece was produced with the same procedures of Example 5 except for using the calcined coke thus produced to measure the coefficient of thermal expansion and puffing. The results are set forth in Table 5.

Comparative Example 6

A low sulfur crude oil with a sulfur content of 0.2 percent by mass, a nitrogen content of 0.3 percent by mass and a saturate content of 40 percent by mass was vacuum-distilled thereby producing a vacuum distillation residue (hereinafter referred to as "vacuum distillation residue C"). The vacuum distillation residue C was placed into a test tube and heated at a pressure of 400 kPa and a temperature of 500° C. for 40 hours to be coked. The raw coke thus produced was embedded into a commercially available resin and observed through a polarized microscope. It was found that 18 percent of the mosaic texture of 10 μm or smaller existed. The coke was heated at a temperature of 2800° C. under a nitrogen atmosphere thereby producing a graphitized product. The graphitized product was subjected to the X-ray diffraction measurement (see "GAKUSHIN" method established by the 117 Committee of the Japan Society for the Promotion of Sciences) and the results are set forth in Table 4 below.

Thereafter, the raw coke thus produced was calcined at a temperature of 1000° C. for 5 hours thereby producing calcined coke. The sulfur and nitrogen contents and bulk specific gravity of the calcined coke thus produced are set forth in Table 5.

A cylindrical piece was produced with the same procedures of Example 5 except for using the calcined coke thus produced to measure the coefficient of thermal expansion and puffing. The results are set forth in Table 5.

Comparative Example 7

The vacuum distillation residue C and fluidized catalytic cracked residue B were mixed at a mass ratio of 1:1 thereby producing a feedstock composition. The feedstock composition was placed into a test tube and heated at a pressure of 400 kPa and a temperature of 500° C. for 40 hours to be coked. The coke thus produced was embedded into a commercially available resin and observed through a polarized microscope. It was found that 5 percent of the mosaic texture of 10 μm or smaller existed. The coke was heated at a temperature of 2800° C. under a nitrogen atmosphere thereby producing a graphitized product. The graphitized product was subjected to the X-ray diffraction measurement (see "GAKUSHIN" method established by the 117 Committee of the Japan Society for the Promotion of Sciences) and the results are set forth in Table 4 below.

Thereafter, the coke thus produced was calcined at a temperature of 1000° C. for 5 hours thereby producing calcined coke. The sulfur and nitrogen contents and bulk specific gravity of the calcined coke thus produced are set forth in Table 5.

A cylindrical piece was produced with the same procedures of Example 5 except for using the calcined coke thus produced to measure the coefficient of thermal expansion and puffing. The results are set forth in Table 5.

Comparative Example 8

The vacuum distillation residue C and fluidized catalytic cracked residue B were mixed at a mass ratio of 1:5 thereby producing a feedstock composition. The feedstock composition was placed into a test tube and heated at a pressure of 400 kPa and a temperature of 500° C. for 40 hours to be coked. The coke was heated at a temperature of 2800° C. under a nitrogen atmosphere thereby producing a graphitized product. The graphitized product was subjected to the X-ray diffraction measurement (see "GAKUSHIN" method established by the 117 Committee of the Japan Society for the Promotion of Sciences) and the results are set forth in Table 4 below.

Thereafter, the coke thus produced was calcined at a temperature of 1000° C. for 5 hours thereby producing calcined coke. The sulfur and nitrogen contents and bulk specific gravity of the calcined coke thus produced are set forth in Table 5.

A cylindrical piece was produced with the same procedures of Example 5 except for using the calcined coke thus produced to measure the coefficient of thermal expansion and puffing. The results are set forth in Table 5.

TABLE 4

| | Ratio of crystallite size to lattice constant | |
|---|---|---|
| | hkl (002) plane | hkl (110) plane |
| Example 5 | 330 | 1250 |
| Example 6 | 340 | 1210 |
| Comparative Example 5 | 400 | 1650 |
| Comparative Example 6 | 370 | 1600 |
| Comparative Example 7 | 380 | 1570 |
| Comparative Example 8 | 390 | 1600 |

TABLE 5

| | Sulfer content (mass %) | Nitrogen content (mass %) | Bulk specific gravity | Coefficient of thermal expansion ($\times 10^{-6}$/° C.) | Puffing (%) |
|---|---|---|---|---|---|
| Example 5 | 0.20 | 0.10 | 0.84 | 1.20 | 0.10 |
| Example 6 | 0.10 | 0.10 | 0.84 | 1.20 | 0.10 |
| Comparative Example 5 | 0.10 | 0.10 | 0.84 | 1.80 | 0.10 |
| Comparative Example 6 | 0.50 | 0.70 | 0.78 | 2.00 | 1.10 |
| Comparative Example 7 | 0.40 | 0.40 | 0.80 | 1.50 | 0.50 |
| Comparative Example 8 | 0.20 | 0.30 | 0.82 | 1.40 | 0.30 |

The invention claimed is:

1. A method of producing a needle coke, comprising: coking a feedstock composition to produce a raw coke having a structure such that the graphitized product resulting from graphitization of the raw coke at a temperature of 2800° C. under an inactive gas atmosphere will have ratios of the crystallite size to the lattice constant of 360 or less in the (002) plane and 1500 or less in the (110) plane; and calcining the raw coke at a temperature of 800° C. to 1600° C., wherein the feedstock composition comprises a first heavy oil and a second heavy oil, wherein the first heavy oil has an initial boiling point of 200° C. or higher and is produced by hydrodesulfurizing a heavy oil with a sulfur content of 2 percent by mass or more at a total pressure of 16 MPa or greater so that a hydrocracking rate will be 30 percent or less, and wherein the second heavy oil has an initial boiling point of 150° C. or higher and a sulfur content of 0.5 percent by mass or less and is produced as a residue by fluidized catalytic cracking of a hydrocarbon oil.

2. The method of producing a needle coke according to claim 1, wherein the graphitized product resulting from graphitization of the raw coke at a temperature of 2800° C. under an inactive gas atmosphere has a true specific gravity of 2.23 or greater.

3. The method of producing a needle coke according to claim 1, wherein a sulfur content of the raw coke is 0.3 percent by mass or less and a bulk specific gravity of the raw coke is 0.55 or greater.

4. The method of producing a needle coke according to claim 1, wherein a sulfur content of the needle coke is 0.5 percent by mass or less, a nitrogen content of the needle coke is 0.1 percent by mass or less, and the needle coke has a bulk specific gravity of 0.82 or greater.

5. The method of producing a needle coke according to claim 1, wherein the coking of the feedstock composition is carried out at a pressure of 300 to 800 kPa and at a temperature of 400 to 600° C.

6. The method of producing a needle coke according to claim 1, wherein the first heavy oil has a saturate content of 60 percent by mass or more, a sulfur content of 0.5 percent by mass or less and an asphalten content of 5 percent by mass or less.

7. The method of producing a needle coke according to claim 1, wherein the hydrocarbon oil is selected from the group consisting of straight-run gas oil, vacuum gas oil, desulfurized gas oil, desulfurized vacuum gas oil, atmospheric distillation residue, vacuum distillation residue, shale oil, tar sand bitumen, Orinoco tar, coal liquid and those produced by hydrorefining any one or more of these oils.

8. The method of producing a needle coke according to claim 1, wherein a ratio of 10 μm or less of the mosaic texture present in the raw coke is 2 percent or less when the feedstock composition is heated at a temperature of 500° C.

9. A method of producing a needle coke, comprising: coking a feedstock composition which comprises a first heavy oil and a second heavy oil to produce a raw coke, wherein the first heavy oil has an initial boiling point of 200° C. or higher and is produced by hydrodesulfurizing a heavy oil with a sulfur content of 2 percent by mass or more at a total pressure of 16 MPa or greater so that a hydrocracking rate is 30 percent or less, and wherein the second heavy oil has an initial boiling point of 150° C. or higher and a sulfur content of 0.5 percent by mass or less and is produced as a residue by fluidized catalytic cracking of a hydrocarbon oil, and then calcining the raw coke at a temperature of 800° C. to 1600° C.

* * * * *